April 29, 1924.
M. WEINER
1,492,342
FLEXIBLE BRACELET
Filed Jan. 29, 1923
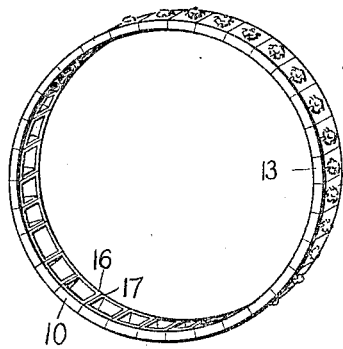
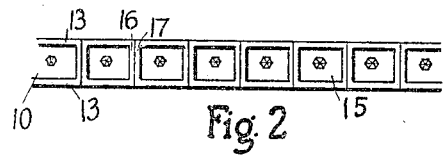
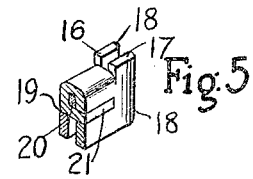
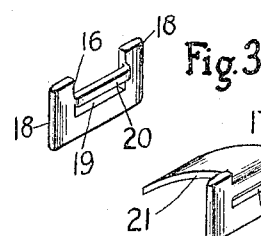
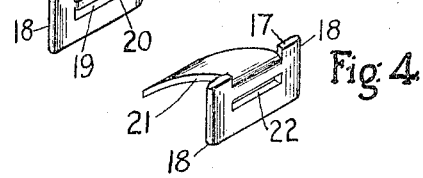
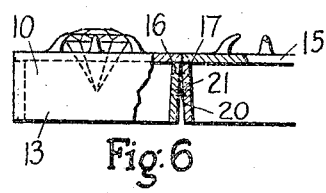
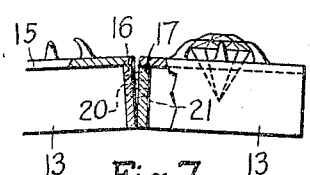
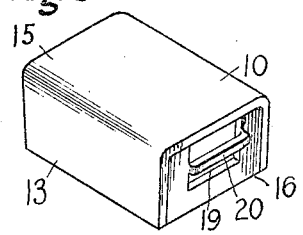
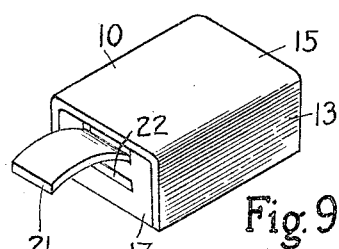
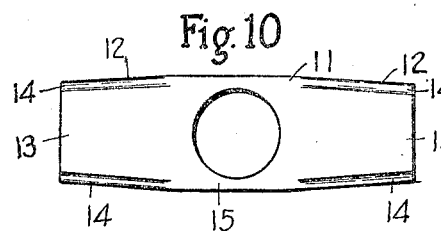
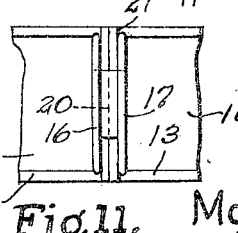
INVENTOR
Morris Weiner
BY
Harry Jacobson
ATTORNEY Patented Apr. 29, 1924.

1,492,342

UNITED STATES PATENT OFFICE.

MORRIS WEINER, OF NEW YORK, N. Y.

FLEXIBLE BRACELET.

Application filed January 29, 1923. Serial No. 615,461.

*To all whom it may concern:*

Be it known that I, MORRIS WEINER, a citizen of the United States, and resident of the city of New York, in the county of Bronx and State of New York, have invented certain new and useful Improvements in Flexible Bracelets, of which the following is a specification.

This invention relates to flexible bracelets and particularly to the links therefore and to the means for joining said links together.

One of the objects of this invention is the provision of a light, though strong and durable link unit which presents the appearance of a solid link.

A further object of this invention is the provision of a simple and inexpensive method for making a pair of said links.

Further objects include the provision of a strong joint between the bracelet links, which joint is invisible from all angles of vision and which allows limited hinged movement between adjacent links and the provision of a joint which is adapted for use in both fine and cheap jewelry and which is entirely contained between the adjacent walls of adjacent links for flexibly securing the links together.

For the attainment of the aforesaid and other objects as will hereinafter appear, I employ the arrangements and combinations of parts shown in the preferred forms in the accompanying drawings, in which, Fig. 1 is a perspective view of my improved bracelet. Fig. 2 is a bottom plan view of a part of the same. Fig. 3 is a perspective view of one of the end walls of a link unit. Fig. 4 is a similar view of the other of the end walls of said unit. Fig. 5 is a partial vertical section and perspective view of the end walls of a pair of adjacent links joined in accordance with my improved method. Fig. 6 is a side view and partial section of a pair of links in the position assumed thereby when the bracelet is flattened out. Fig. 7 is a similar view of the same in the position assumed thereby when the bracelet is in use. Fig. 8 is a perspective view, greatly exaggerated in size, of one end of my improved links, as it would appear were a single unjoined end member inserted therein. Fig. 9 is a similar view of the other end thereof, and Fig. 10 is a bottom plan view of one of the blanks from which the link body is made and Fig. 11 is a bottom plan view of one corner of one of the link units.

In the illustrated embodiment of my invention, I form the main body portion of a link unit 10 by bending the substantially rectangular blank 11 into U form. The side edges of said blank are tapered near the ends 12 thereof. Sides as 13 are bent downwardly from said blank 11 and have suitable grooves 14, preferably semi-circular in section, cut therein. Said grooves are preferably cut immediately adjacent to the tapered edges 12, and are adapted to have the end pieces 16 and 17 inserted therein for giving said link 10 its box-like appearance. The top 15 of the link body may have a suitable opening therein for the reception of a precious stone, held to said top in the usual manner, while the sides 13 are adapted to have suitable designs engraved or cut on the outside faces thereof.

The end pieces as 16 and 17 complete the link unit, the edges 18 of each of said end pieces being preferably made semi-circular, for insertion into the grooves 14, flush with the edges of the link body member. For the cheaper kind of bracelet made of base metal, the edges 18 of the end pieces may be forced into the grooves 14 and no further precautions taken for permanently connecting said pieces to the sides 13, there being sufficient frictional engagement between the edges 18 and the grooves 14 to prevent displacement of said end pieces. For fine gold or platinum jewelry, I prefer to solder the end pieces to the sides 13 in such a manner as to make the link body appear to be a hollow box worked out of a single piece of metal. My improved joint connecting the links is contained entirely between said ends 16 and 17, which appear flat to the observer looking at the inside of the link, the joint being difficult of detection from any angle. Said joint is substantially invisible after the bracelet is assembled, there being no parts projecting beyond the inner faces of said ends after they have been joined in the manner which will be described hereinafter. A horizontally disposed slot as 19 is cut partway across the end piece 17, and a hinge bar portion 20 struck horizontally outwardly from said end piece a distance substantially equal to the thickness of the tongue 21. Said tongue is formed preferably integrally with the end piece 17 and is adapted to be passed over said bar 20, then through the slot 19, and finally back through the slot 22 of the end piece 17. Said slot 22 is made of substantially the same size as the slot 19 in the end 16, both of said slots being suitably dimensioned to receive the tongue 21. That part of the end piece 16 directly above the bar 20 is preferably entirely removed to allow the tongue 21 to be pressed into close contact with the upper side of said bar, and to be readily bent thereabout, while the corresponding part of the end piece 17 directly above said tongue is also removed when the tongue is formed from said piece, as will be readily understood.

In assembling my improved link, I prefer to first join the end pieces 16 and 17 together before inserting them in the adjacent grooves 14 of adjacent links. The joint is made by passing the tongue 21 over around the bar 20 and through the slot 19, after which said tongue is bent backwardly upon itself and passed through the slot 22, thereby filling said slots 19 and 22 and completely enclosing the hinge bar 20. It will be seen that the end pieces 16 and 17 are separated a distance equal to the thickness of the hinge bar 20 and that said end pieces are relatively rotatable in either direction, but that further rotation is prevented in the limiting positions of said end pieces, which positions occur when either the two top edges or the bottom edges come into contact.

After the ends 16 and 17 have been properly joined together, it will be noted that the thickness of the joined pieces is greater than the combined thicknesses of the end pieces by an amount equal to the thickness of the hinge bar, and that no parts of the joint extend beyond the inner faces of the ends, it being understood that by the inner faces I mean those on the inside of the finished link.

I prefer to make a pair of links at a time. Said links may be formed by sliding the edges 18 of the joined piece 16 into the grooves 14 of one link, and doing the same with the edges 18 of the other joined piece 17, after which the end pieces 16 and 17 may be soldered in place if desired.

When the pair of joined links 10 are moved relatively so that the tops 15 thereof lie in the same plane (Fig. 6) the end edges of said tops are in close contact and prevent backward curvature of the bracelet into a concave position, and the joint between links is hardly discernible. When the bracelet is put on by the wearer, the links 10 rotate to a slight extent about the bar 20, until a perfect circle is formed by the bracelet, after which further rotation is prevented by the contacting lower edges of the links. Said links in this position become very slightly separated at the top, though the opening between them is hardly appreciable owing to the peculiar construction of my improved joint (Fig. 7). Enough rotation of the parts is provided to allow the bracelet to be easily put on and taken off, while a strong joint, defying detection, is provided.

It will be understood that various changes, such as in the shape and position of the hinge bar, tongue and slots, in the shape and proportions of the link bodies and in the grooves into which the end pieces are inserted, may be made without departing from the scope of my invention.

I claim:

1. In a bracelet, a series of links, and means for flexibly joining adjacent links together comprising end members, adapted to be secured in juxtaposition to adjacent links, at the ends of said links, and means on each of said members offset from and integral with the remainder of each of said members respectively and limited to the space between said adjacent members for joining said members together.

2. In a bracelet, a series of links, an end member secured to each link, and inter-engaging means limited entirely to the space between the inner faces of the adjacent end members of adjacent links for flexibly joining said members and said adjacent links together.

3. In a bracelet, a pair of U-shaped link-forming body members, a pair of end members each inserted in one of the adjacent ends of and covered by the body member into which it is inserted, means integral with and projecting from one of said members toward the other of said members, and means integral with the other of said members adapted to be bent around said projecting means for flexibly joining said members together.

4. A bracelet link, comprising a top member, a pair of tapered side members integral with said top and having grooves at the edges thereof, a pair of end pieces fitted into said grooves, and co-acting means each integral with one of said end pieces for flexibly joining the end piece of one link to the adjacent end piece of the adjacent link.

5. In a bracelet link, a U-shaped body member having grooves at the edges of the sides thereof, a slotted end member inserted in the grooves at one end of said link, a hinge bar extending outwardly from said end member, a second slotted end member inserted in the grooves at the other end of said link, and a tongue on said second member for engaging a hinge bar.

6. In a bracelet, a pair of link-forming body members, a pair of end members secured in juxtaposition in the adjacent ends of said body members, and a joint contained entirely within the limits of the inner faces of said end members securing said end members together.

7. In a bracelet, a pair of link-forming body members, a pair of end members secured in juxtaposition in the adjacent end of said body members, and a flat joint contained entirely within said end members and limited by substantially parallel plane surfaces at the inner faces of said end members securing said end members together.

8. In a bracelet, a pair of links each comprising a top, tapered sides, and slotted end walls, a hinge bar portion extending outwardly from one of said end walls toward the adjacent end wall of the adjacent link, and a tongue on said last mentioned end wall passing about said hinge bar portion and through the slots of said end walls.

9. In a bracelet, a pair of adjacent boxlike links, and a joint covered from view limited by substantially plane parallel surfaces at the inner faces of adjacent ends of said links, for flexibly securing said adjacent links together.

10. In a bracelet, a pair of adjacent links, end walls in said links and interengaging joint members on the adjacent walls of adjacent links for forming an invisible flat flexible joint between said end walls having substantially parallel plane surfaces in the plane of the inner faces of said respective adjacent end walls.

11. In a bracelet, a pair of U-shaped link-forming body members, each comprising a top, tapered sides having grooves at the edges thereof, and slotted end walls inserted in said grooves, a hinge bar portion integral with and offset from one of said end walls toward the adjacent end wall of the adjacent link a distance equal substantially to the thickness of the tongue hereinafter mentioned and a tongue integral with the other of said end walls passing first over said hinge bar portion, then through the slot of said first mentioned end wall and terminating in the slot of said second mentioned end wall to form a flat flexible joint between said end walls wherein the outermost portion of said tongue does not extend past the inner wall of the member carrying said hinge bar portion.

12. The method of making a pair of flexibly connected bracelet links comprising the provision of a pair of end link members, joining said members together, making a pair of U-shape link members, and then securing one of each of said joined end members in one end of each of said U-shaped members.

13. In a bracelet, a series of links, a flat end member in each of said links, and a hinge bar on each end member offset from the plane of the outer face of said member on which adjacent links are relatively rotatable, formed from one end of each of said links and projecting into the space between adjacent links.

14. In a bracelet, a series of links, a pair of slotted end members secured in each of said links at the ends thereof to form a hollow box, and a joint, formed from and entirely within said end members comprising a tongue on one of said end members bent substantially to fill the slots in both of said end members, for rendering said joint invisible and for causing each of said end members to appear to be an integral part of said link.

Signed at New York, in the county of New York and State of New York this 27th day of January, 1923.

MORRIS WEINER.